March 15, 1949.    G. GULDBRANDSEN    2,464,445
FLOATING DIAL SCALE

Filed July 24, 1946    2 Sheets-Sheet 1

Fig.1.

INVENTOR
GULDBRAND GULDBRANDSEN
BY Paul L. Keshu
ATTORNEY

March 15, 1949.　　　　G. GULDBRANDSEN　　　　2,464,445
FLOATING DIAL SCALE

Filed July 24, 1946　　　　　　　　　　　　　　2 Sheets-Sheet 2

INVENTOR
GULDBRAND GULDBRANDSEN
BY Paul L. Krohn
ATTORNEY

Patented Mar. 15, 1949

2,464,445

UNITED STATES PATENT OFFICE 2,464,445

FLOATING DIAL SCALE

Guldbrand Guldbrandsen, St. Johnsbury, Vt., assignor to Fairbanks, Morse & Co., Chicago, Ill., a corporation of Illinois Application July 24, 1946, Serial No. 685,972

4 Claims. (Cl. 265—62)

This invention relates to weighing scales and particularly to dial scales having certain improvements in the construction and operation thereof.

An object of the invention is to provide a scale of the type indicated with improved force transmitting and balancing mechanism constructed and arranged in such manner as to produce a smooth easy action which enhances the accuracy of weight indications over the full range of the scale load capacity.

Another object of the invention is to provide a novel arrangement of motion dampening device mounted on and movable with the load force transmission means and relatively movable with the weight indicating mechanism.

Other objects and advantages will readily appear from an examination of the drawings in which:

Fig. 1 is a rear view of a weighing scale with the dial back cover plate and beam housing back cover plate removed to show the interior mechanism;

Figure 2:
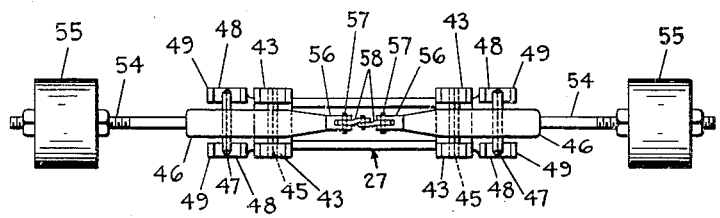
Fig. 2 is a top plan view of a portion of the scale mechanism and particularly the pendulum units, as taken on line 2—2 of Fig. 1.

Referring to the drawings, the weighing scale is shown as having a general housing structure of which 10 indicates the dial scale housing which is fixedly mounted on a beam housing 11. Within the beam housing there is provided a fulcrum stand 12 holding a bearing 13, the bearing having a V-groove for support of a fulcrum pivot 14 fixed in the scale beam 15. A load pivot 16 is mounted in the beam 15 to assume a desired position relative to pivot 14 when the beam is in its normal inoperative or neutral position. A draft rod 17 is suspended from the pivot 16 by a U-shaped loop 18 (Fig. 3) and is adapted to transmit force from a suitable platform and lever system (not shown) to the scale beam 15.

A novel arrangement is provided for mounting the beam load pivotal means (Figs. 1 and 3), the arrangement being exemplified by a plate member 19 adjustably mounted by screws 20 parallel to and spaced from the upper edge of the beam 15. The plate 19 has depending from each side thereof a pivot holding arm 21 in which are fixedly mounted load pivots 22. The device is adjustable so that the distance between the knife edges of pivots 16 and 22 may be properly regulated, since at no time should the knife edge of dial load pivot 22 assume a position below a horizontal pivot line (not shown) drawn through the knife edge of the fulcrum pivot 14. In this connection, it is desirable that the knife edge of pivot 16 be located so as to assume a position at this horizontal line when the scale is unloaded or in its neutral no load position.

A substantially inverted U-shaped loop member 23 is provided with circular openings in the downwardly projecting arms thereof for receiving the pivot 22, the member in turn, being connected to a vertically adjustable connecting rod 24, the upper hooked end of which engages in a U-shaped loop 25.

Mounted inside the dial housing 10 on laterally extending lugs 26 is an upwardly directed frame 27 which is formed with open sides, front, top and base. An equalizer member in the nature of a bar 30 is pivotally mounted by bearings 28 (Fig. 3) to a pair of arms 29 depending from the base of the frame 27. In its preferred form, the equalizer bar 30 is formed with three transversely disposed and longitudinally spaced lugs 31, each lug having provided therethrough a knife-edge pivot element 32. The centrally disposed lug 31 and particularly its pivot 32 is adapted to support the U-shaped bearing loop 25 and thereby transmit a load from the scale beam 15 to the equalizer bar 30, and thence to the scale weight indicating mechanism through force transmitting means now to be noted.

Attached to the outer pair of spaced pivots 32 by U-shaped bearing loops 33 are adjustable bearing holders 34, each of the latter having a vertically adjustable suspension rod 35. The upper end of each rod 35 is connected at the center of a dashpot supporting cross bar 36 on which is carried a dashpot holder 37.

Figure 4:
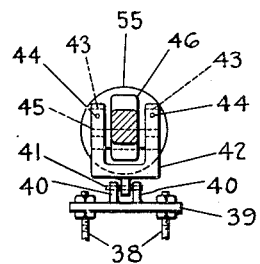
Fig. 4 is a further fragmentary side view taken on line 4—4 of Fig. 1 showing the connection between the force transmission means and one of the pendulum units.

Fixedly attached near the outer ends of each cross bar 36 are the lower ends of a pair of spaced rods 38, the upper ends of each pair of rods being connected to cross bars 39 respectively (Fig. 4). Each bar 39 is provided with centrally located and spaced lugs 40 for connection, as by a pin 41, with a short downwardly projecting extension or ear on the lower end of a U-shaped bearing retainer or yoke 42. As viewed in Figs. 2 and 4, it appears that each upstanding arm of the bearing retainer 42 is bifurcated to provide suitable supports for a pair of bearing steels 43, the latter being pivotally mounted on pins 44 and adapted to receive the knife edges of load pivots 45, in turn, mounted in goose-necked pendulum holders 46 (Figs. 1 and 2). The pendulum holders 46 are each provided with transverse fulcrum pivots 47 which rest in the V-grooves of a cooperating bearing 48, each pivotally mounted on a pin 48' carried between the spaced arms of bearing supports 49 located on and constituting a part of the upper end of the frame 27.

Each of the goose-necked pendulum holders 46 is formed to provide for receiving and supporting a threaded rod 51 on which is adjustably mounted a pendulum 52. The respective pendulums 52 and rods 51 are mounted in such a manner that at neutral or zero load on the scale the common longitudinal axis or center line of the cooperating pendulums and rods will be substantially vertically directed, whereby a projection of the center line through the rods 51 will intersect the knife-edge of the respective fulcrum pivots 47; and at capacity indication of the scale the pendulums and rods will be displaced to a position approximately as shown in Fig. 1, but never beyond a position of more than 45 degrees from the neutral position.

Fixedly mounted in each of the pendulum holders 46 by pins 53 are threaded rods 54 on which are adjustably mounted counterweights 55. The counterweights 55 and rods 54 are arranged to assume a position in which the center line when horizontally directed will intersect the knife-edges of fulcrum pivots 47, and this position is attained at or close to a condition of capacity indication as illustrated in Fig. 1; and when the scale is in neutral position the counterweights are positioned not more than 45 degrees from the capacity positions.

The inwardly directed ends of the pendulum holders 46 are each inclined upwardly to terminate in a bifurcated end portion 56 (Fig. 2) adapted to receive a depending link 58, the latter being operatively carried by a pivot pin 57. The lower end of each link 58 is pin-connected to a common connecting block 59 on which is carried in depending relation an operating rack bar 60. It will be observed that the teeth of the rack 60 mesh with the teeth of a pinion 61, and that pinion 61 is mounted on a shaft 63 which is common to a pointer hand 62. A friction roller device 64 is mounted in the frame 27 in such manner that the roller will engage the back of the rack 60 and thus retain the rack in mesh with the pinion 61.

It will now appear that a load pull on draft rod 17 will cause the beam 15 to swing clockwise about its pivot 14 and transmit the load through pivots 16 and 22 to the member 23 and thence to equalizer bar 30 through rod 24. The bar 30 effects a simultaneous load pull on the spaced force transmitting means including rods 35, 38 and interconnecting bars 36. In this manner the resulting motion of the force transmitting means cause simultaneous and opposite displacement of the pendulum holders 46 to effect downward displacement of the common connector block 59 to which the drive rack 60 is secured. It will be noted that the displacement of block 59 is relatively greater than that of the force transmitting means due to the geometry of the pivots and moment arms in the present assembly. Motion of rack 60 results in rotation of pinion gear 61 and consequent displacement of the pointer 62.

At the time pendulum holders are moved due to a weight pull on rod 17, it will be appreciated that the respective pendulums and counterweights 52 and 55 will swing from the neutral or no load position to a new position in which their mass effectively opposes the weight pull at rod 17 to equalize the force impressed on the scale mechanism and at a point having a predetermined relation to the weight placed on the scale. Thus the pointer will come to rest at a proper place which is indicative of the true weight desired to be ascertained.

Since the present scale mechanism is arranged for substantially equalized load force transfer to the respective pendulum hangers and hence free responsive movement to objects placed on its platform (not shown), it follows that the pointer 62 will undergo a period of oscillation before reaching a position of equilibrium which is indicative of the weight of the objects. Accordingly it is desirable to provide a two-part motion damping means for the scale mechanism to limit the oscillation of the pointer and hence aid in the attainment of its equilibrium position rapidly but without seriously impairing the true weight indicating function thereof. It is of course, well known to provide damping means for this purpose, but in the present scale the damping means is arranged to have one part thereof dampen pointer oscillations and the other part dampen vertical motion of the force transmitting means whereby the scale function and weight indication will be improved.

Figure 3:
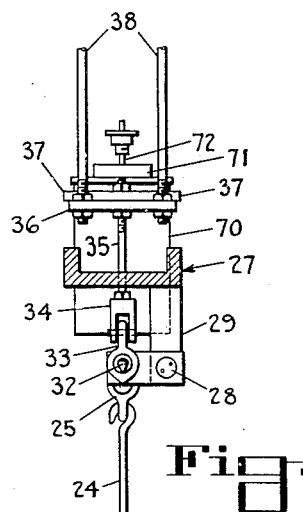
Fig. 3 is a fragmentary side view of the beam and force transmission means, as seen along line 3—3 of Fig. 1.
Figure 5:
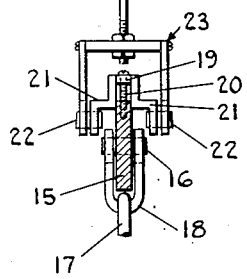
Fig. 5 is a fragmentary sectional view of the motion damping mechanism as herein preferred, the view being taken at line 5—5 in Fig. 1.

With reference to Figs. 1, 3 and 5, the motion damping means may be seen to comprise a first part or dashpot 70 carried in holder 37 and suspended thereby on cross bars 36 of the force transmitting means. The dashpot cover 71 is suitably apertured to receive an outwardly extended rod 72, the inner end of which is connected to a second part of the dampening means in the nature of a piston 69 movably disposed within the dashpot in a manner well understood. The piston 69 effectively divides the dashpot into an upper and lower chamber, and oppositely acting valve elements 68 carried by the piston permit flow of a damping fluid between the chambers. The outer end of rod 72 is attached to a cross bar 73 at an intermediate point while one end of the bar 73 is connected to the connector block 59 by means of a rod 74 and connector element 75 at its upper end. The opposite end of bar 73 carries a compensating counterweight 76 for an obvious purpose.

In the preferred arrangement of motion damping means it has been found most desirable to have the dashpot and cooperating piston move in the same sense but at a differential rate, with the piston capable of moving through a greater distance than the dashpot to afford the requisite degree of sensitivity to the pointer and pointer operating mechanism. In Fig. 5 the full line view corresponds to the no-load position of the piston and dashpot, while the broken line view indicates the positions of relative movement attained thereby and corresponds to the displaced positions attained by the pendulums as seen in Fig. 1. In this connection it will appear that the dashpot 70 carried by the force transmitting means (Fig. 1) will have a rate of motion differing from that for the piston since the distance between the respective pairs of pivot elements 45 and 47 is considerably less than the effective distance from either of the pivots 47 to the connection of pendulum holders 46 with the connector block 59. As a result the motion of the piston will develop at a rate greater than that of the dashpot in substantially the ratio of the distance between either pivot element 47 and the effective point of connection of the pendulum holders 46 with the connector block 59, to the distance between either pivot element 47 and the adjacent one of the pivot elements 45.

It will now appear that for each weight indicating operation of the scale mechanism, the damping piston 69 will move relative to the dashpot 70 and in the same sense or direction of dashpot movement until a scale load equilibrium position is reached. As a result, the piston has considerably less tendency to stick to the dashpot wall, the frictional resistance to piston movement is reduced if not entirely eliminated, and a smooth, free movement of the pointer is obtained with less oscillating effect before equilibrium is reached. Moreover, should the scale be set in an out-of-level position, the dragging effect between piston and dashpot wall will be minimized to a greater degree than is possible with the usual damping means having a fixed dashpot.

While the foregoing description makes reference to only one example of the invention, it is believed clear that variations in arrangement and construction thereof will come to mind without departing in any way from the spirit in which the disclosure is given, and it is the aim to include all such variations within the scope of the claims annexed hereto.

What is claimed is:

1. In a weighing scale, the combination of a housing structure having a frame therein, a scale beam pivoted in the housing for movement in response to a load placed on the scale, a pair of pendulum hangers pivoted on said frame, a pendulum on each hanger, load indicating means carried by the frame and operatively connected with each of said hangers for movement to a position indicating the weight of the load on the scale, force transmitting means operatively connected between said scale beam and each of said hangers for causing movement of the latter in response to scale beam movement to swing the pendulums to a position of equilibrium with the load on the scale, said force transmitting means having a force equalizing member connected at its center with the scale beam to afford a substantially equal force transmission to each of said hangers from said scale beam, and motion damping means having two relatively movable, opposed, reaction damping parts, one thereof being operatively connected to and movable with said force transmitting means, and the other being operatively connected to and movable with said load indicating means.

2. In a weighing scale, the combination of a housing having a frame therein, a scale beam pivoted in the housing for movement in response to a load placed on the scale, a pendulum hanger pivoted on said frame, a pendulum on said hanger, force transmitting means operatively connected between said pendulum hanger and scale beam for causing movement of the hanger in response to scale beam movement to move the pendulum to a position of equilibrium with the load on the scale, load indicating means carried by the frame and operatively connected to said pendulum hanger for movement to a position indicating the weight of the load on the scale, said indicating means and force transmitting means having differing rates of movement, and a two-part motion damping means for the scale, one part of which is connected to and movable with said force transmitting means and the other part of which is connected to and movable with said indicating means.

3. In a weighing scale, the combination of a housing having a frame therein, a scale beam pivoted in the housing for movement in response to a load placed on the scale, a pendulum hanger pivoted on said frame, a pendulum on said hanger, force transmitting means operatively connected between said pendulum hanger and scale beam for causing movement of the hanger in response to scale beam movement to move the pendulum to a position of equilibrium with the load on the scale, load indicating means carried by the frame and operatively connected to said pendulum hanger for movement to a position indicating the weight of the load on the scale, said indicating means and force transmitting means having differing rates of movement, and motion damping means of the piston and dashpot type, said dashpot being connected to and movable with said force transmitting means and said piston being connected to and movable with said indicating means.

4. In a weighing scale, the combination of a housing structure having a frame and a fulcrum stand therein, a scale beam fulcrumed on said stand for movement in response to a load on the scale, a hanger pivoted on said frame, a scale load indicating pointer rotatively carried in said frame, geared means for rotating said pointer, an operating connection between said geared means and said hanger at a point thereon spaced from said hanger's pivot point on said frame, force transmitting means connected from said scale beam to said hanger adjacent said hanger's pivot point on said frame, said operating connection having a range of travel relatively greater than the range of travel of said force transmitting means upon scale beam movement in response to a load, and means for damping the motion of said operating connection comprising a piston connected to and movable with said operating connection and a fluid containing dashpot receiving said piston and secured to said force transmitting means for movement therewith, said piston and dashpot being relatively movable in accordance with the relative ranges of travel of said operating connection and said force transmitting means for effective motion damping.

GULDBRAND GULDBRANDSEN.

REFERENCES CITED

The following references are of record in the file of this patent:

UNITED STATES PATENTS

| Number | Name | Date |
|---|---|---|
| 1,078,416 | Charet | Nov. 11, 1913 |
| 1,352,097 | Sonander | Sept. 7, 1920 |
| 1,429,662 | Wetzel | Sept. 19, 1922 |
| 1,504,609 | Crane | Aug. 12, 1924 |

FOREIGN PATENTS

| Number | Country | Date |
|---|---|---|
| 315,281 | Great Britain | July 11, 1929 |